United States Patent
Nieuwoudt et al.

(10) Patent No.: US 12,059,641 B2
(45) Date of Patent: Aug. 13, 2024

(54) VAPOR DISTRIBUTOR FOR A MASS TRANSFER COLUMN AND METHOD INVOLVING SAME

(71) Applicant: KOCH-GLITSCH, LP, Wichita, KS (US)

(72) Inventors: Izak Nieuwoudt, Wichita, KS (US); Malcolm Talbot, Duncan, OK (US)

(73) Assignee: Koch-Glitsch, LP, Wichita, KS (US)

( * ) Notice: Subject to any disclaimer, the term of this patent is extended or adjusted under 35 U.S.C. 154(b) by 478 days.

(21) Appl. No.: 17/433,617

(22) PCT Filed: Mar. 18, 2020

(86) PCT No.: PCT/IB2020/052468
§ 371 (c)(1),
(2) Date: Aug. 25, 2021

(87) PCT Pub. No.: WO2020/194132
PCT Pub. Date: Oct. 1, 2020

(65) Prior Publication Data
US 2022/0143526 A1 May 12, 2022

Related U.S. Application Data

(60) Provisional application No. 62/822,397, filed on Mar. 22, 2019, provisional application No. 62/903,942, filed on Sep. 23, 2019.

(51) Int. Cl.
*B01D 3/32* (2006.01)
*B01D 3/26* (2006.01)

(52) U.S. Cl.
CPC ............... *B01D 3/32* (2013.01); *B01D 3/26* (2013.01)

(58) Field of Classification Search
CPC ......... B01D 3/26; B01D 3/32; B01D 53/0446
(Continued)

(56) References Cited

U.S. PATENT DOCUMENTS 2,915,302 A * 12/1959 Jacir .................... D04B 1/10
261/109
5,464,573 A * 11/1995 Tokerud ............... B01D 3/008
261/DIG. 85

(Continued)

FOREIGN PATENT DOCUMENTS

| CN | 88101479 A | 11/1988 |
| CN | 1055676 A | 10/1991 |

(Continued)

OTHER PUBLICATIONS

Partial English Translation of RU 2641133 C1 (Year: 2018).*
(Continued)

*Primary Examiner* — Charles S Bushey

(57) ABSTRACT

A vapor distributor for use in an internal region of a mass transfer column to receive and redistribute a vapor stream when it is introduced radially into the internal region through a radial inlet in a shell of the mass transfer column. The vapor distributor includes a plurality of multiple-sided elongated deflectors arranged in a descending array and a pair of braces that extend longitudinally across the array of elongated deflectors and hold them in spaced apart and side-by-side relationship to each other. Each of the elongated deflectors has a deflecting surface that faces toward the radial inlet to redirect and redistribute the radially-introduced vapor stream. The braces each include a strut that may also redirect and redistribute the vapor stream.

18 Claims, 7 Drawing Sheets

(58) Field of Classification Search
USPC .......................................... 261/109, DIG. 85
See application file for complete search history.

(56) References Cited

U.S. PATENT DOCUMENTS

| | | | |
|---|---|---|---|
| 7,114,709 B2* | 10/2006 | Ender | ..................... B01D 3/20 261/DIG. 85 |
| 11,484,822 B2* | 11/2022 | Nieuwoudt | ............ B01D 45/08 |
| 2005/0060970 A1* | 3/2005 | Polderman | ............. B01D 45/16 55/320 |
| 2011/0259728 A1 | 10/2011 | Tamminen et al. | |
| 2012/0080105 A1 | 4/2012 | Bambara | |

FOREIGN PATENT DOCUMENTS

| | | | |
|---|---|---|---|
| GB | 1119699 A | | 7/1968 |
| JP | S4820696 B1 | | 6/1973 |
| JP | 2000254403 A | | 9/2000 |
| RU | 2641133 C1 | * | 1/2018 |
| WO | 2017132245 A1 | | 8/2017 |

OTHER PUBLICATIONS

International search report and written opinion received for PCT application No. PCT/IB2020/052468, mailed on May 12, 2020, 9 pages.

* cited by examiner

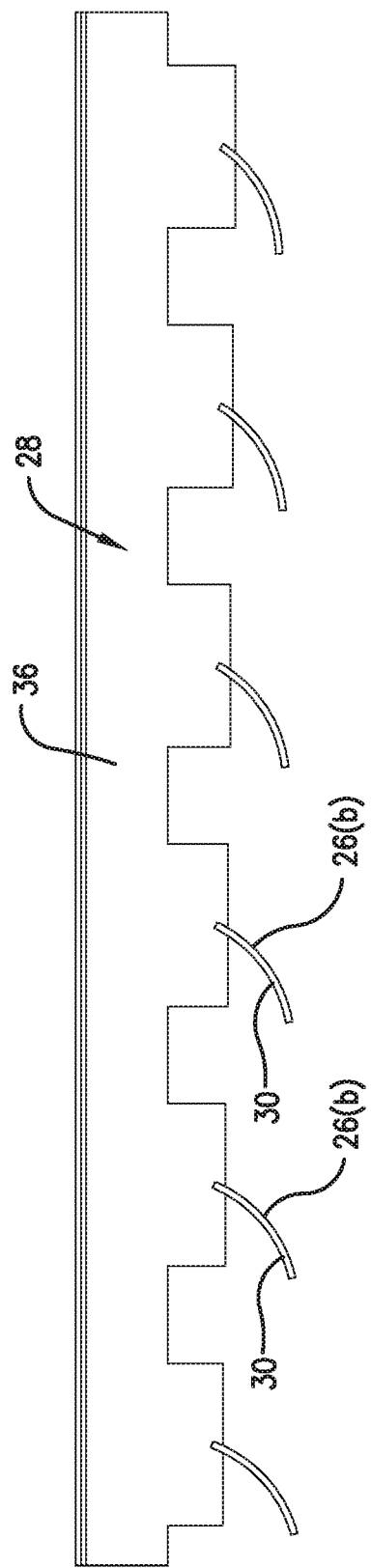

VAPOR DISTRIBUTOR FOR A MASS TRANSFER COLUMN AND METHOD INVOLVING SAME

RELATED APPLICATIONS

This application is a National Phase of International Application No. PCT/IB2020/052468 filed on Mar. 18, 2020, which claims priority to U.S. Provisional Patent Application No. 62/822,397, filed Mar. 22, 2019, and U.S. Provisional Patent Application No. 62/903,942, filed Sep. 23, 2019, the contents of which are incorporated herein by reference in their entireties.

TECHNICAL FIELD

The present disclosure relates generally to mass transfer columns and, more particularly, to vapor distributors for receiving and redistributing a vapor stream introduced into the mass transfer column from a radial inlet and methods of redistributing the vapor stream using the vapor distributors.

BACKGROUND ART

Mass transfer columns are configured to contact at least two fluid streams in order to provide product streams of specific composition and/or temperature. The term "mass transfer column," as used herein is intended to encompass columns in which mass and/or heat transfer is the primary objective. Some mass transfer columns, such as those utilized in multicomponent distillation and absorption applications, contact a gas-phase stream with a liquid-phase stream, while others, such as extraction columns, may be designed to facilitate contact between two liquid phases of different densities. Oftentimes, mass transfer columns are configured to contact an ascending vapor or liquid stream with a descending liquid stream, usually along or above the surfaces of mass transfer structures that are placed in the internal region of the column to facilitate intimate contact between the two fluid phases. The rate and/or degree of mass and heat transferred between the two phases is enhanced by these mass transfer structures, which may be in the form of various types of trays, structured packing, random packing, or grid packing.

The vapor stream is typically introduced to the mass transfer column through a radial or tangential inlet located in a shell of the mass transfer column below a region containing the mass transfer structures while the liquid stream is introduced into the mass transfer column through an inlet above the mass transfer structures. The vapor and liquid streams then flow in countercurrent relation through the region, with the trays or packing serving to distribute the countercurrently-flowing vapor and liquid streams over a larger surface area to enhance their interaction.

In order to increase the efficiency of the mass transfer or heat exchange taking place between the vapor and liquid streams, it is important that the vapor stream be uniformly distributed across the horizontal cross-section of the mass transfer column after it is introduced into the mass transfer column through the inlet and before it enters the region containing the mass transfer structures. Because the velocity of the vapor stream, particularly when it is introduced radially into the mass transfer column, can prevent its desired horizontal distribution, various types of vapor distributors have been utilized to reduce the velocity and redistribute the incoming vapor stream.

While these types of vapor distributors can function satisfactorily in many applications, they may not be suitable for refining separation, petrochemical, chemical and other process applications in which severe conditions such as fouling, coking, erosion, and corrosion are a problem. One type of vapor distributor designed for a radial inlet in these types of severe conditions uses an array of elongated deflectors arranged in a ladder-type structure. The deflectors are pipes that have a circular cross section and extend transversely to the radial inflow of the vapor stream. The deflectors are positioned at successively lower elevations in a direction proceeding away from the radial inlet and each deflector presents a convex deflecting surface facing toward the radial inlet that redirects the radial flow of the vapor stream in upward and downward directions. While the circular cross section of the deflectors is advantageous in that it inhibits the deposition of material from the vapor stream onto the deflectors, it is also disadvantageous because it tends to cause significant portions of the vapor stream to be deflected in the downward direction rather than in the desired upward direction. A further disadvantage of the circular cross section of the deflectors is the convex deflecting surface that is impacted by the vapor stream remains the same and cannot be varied to improve the vapor redistribution by changing the rotational positioning of some or all of the individual deflectors during construction of the vapor distributor. A need thus remains for a vapor distributor that is suited for use in severe service conditions and is able to more effectively redistribute the vapor stream in an upward direction.

SUMMARY

In one aspect, the present disclosure is directed to a vapor distributor for placement in an internal region of a mass transfer column to receive and redistribute a vapor stream when it is introduced into the internal region through a radial inlet in a shell of the mass transfer column. The vapor distributor comprises a plurality of elongated deflectors arranged in an array and each having a non-circular cross section, and at least one brace that extends longitudinally across the array of deflectors and holds them in spaced apart and side-by-side relationship to each other. Each of the deflectors comprises a deflecting surface and wherein the deflecting surfaces face in a common direction toward the radial inlet when the vapor distributor is placed in the internal region of the mass transfer column.

In another aspect, the disclosure is directed to a mass transfer column comprising an upright shell defining an open internal region, a radial inlet positioned at an elevation in the shell for introducing a vapor stream into the open internal area, and a vapor distributor positioned in the open internal area at an elevation at least partially overlapping with the elevation of the radial inlet. The vapor distributor comprises a plurality of elongated deflectors arranged in a descending array in which the deflector positioned closest to the radial inlet is at a higher elevation than the deflector positioned furthest from the radial inlet and at least one brace that extends longitudinally across the array of deflectors and holds them in spaced apart and side-by-side relationship to each other. Each of the deflectors has a non-circular cross section and a deflecting surface. The deflecting surfaces of the deflectors face toward the radial inlet and are positioned at different elevations.

In a further aspect, the disclosure is directed to a method of distributing a vapor stream within the mass transfer column described above that additionally includes including a pair of the braces that extend across the array of elongated deflectors and are positioned in spaced apart relationship to each other a common distance from a notional centerline of the radial inlet. The method comprises the steps of introducing a vapor stream into the open internal region of the shell in a radial direction through the radial inlet at a radial velocity, and reducing the radial velocity and upwardly redistributing the vapor stream by causing successive portions of the vapor stream to be upwardly redirected from the radial direction by the deflecting surfaces of the deflectors in the array of deflectors.

BRIEF DESCRIPTION OF DRAWINGS

In the accompany drawings that form part of the specification and in which like reference numerals are used to indicate like components in the various views:

FIG. 7 is a side elevation view of the vapor distributor shown in FIG. 6.

DETAILED DESCRIPTION OF THE PREFERRED EMBODIMENTS

Figure 1:
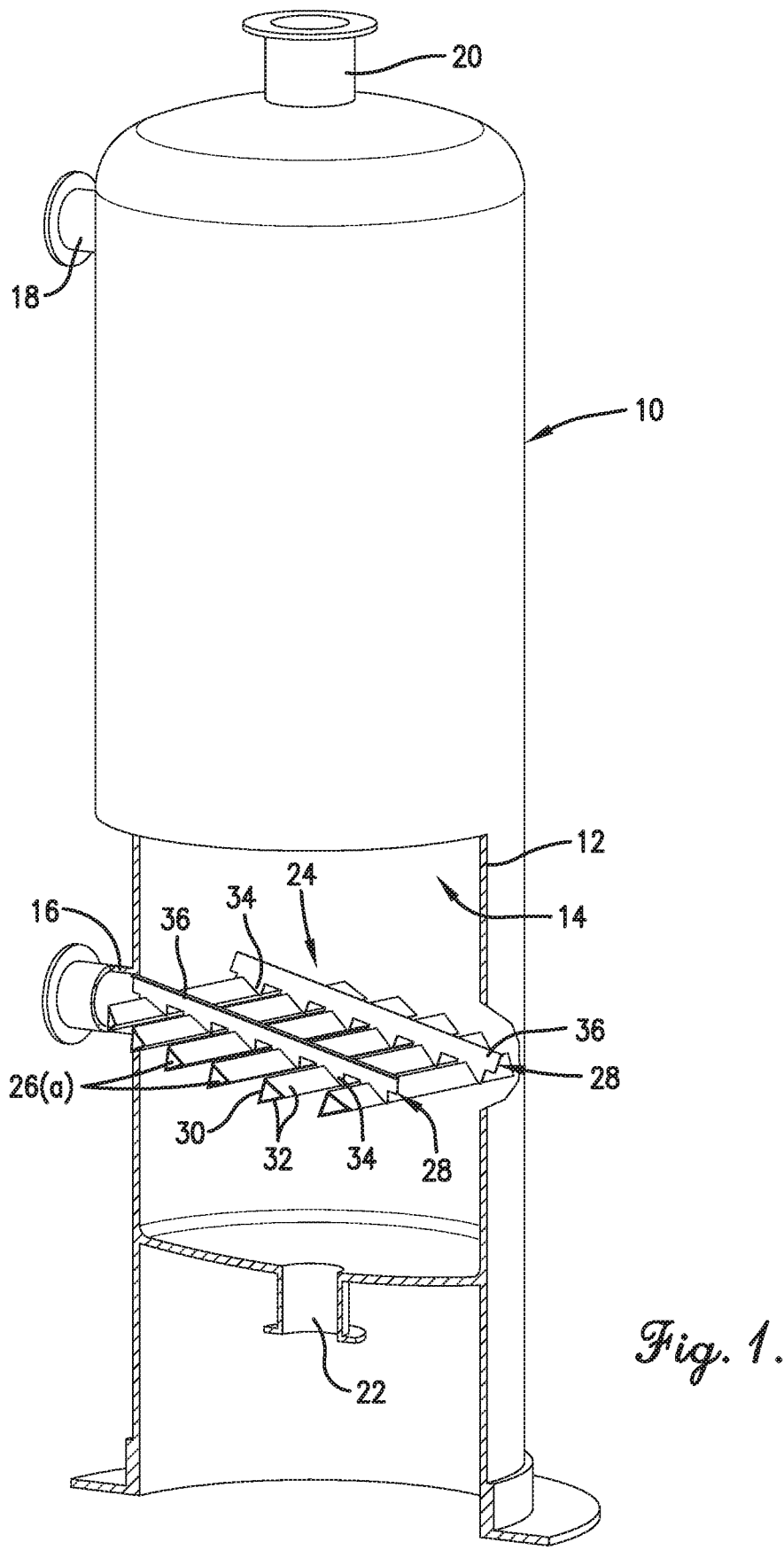
FIG. 1 is a side perspective view of a mass transfer column having portions of its shell broken away to show a vapor distributor positioned to receive and redistribute a vapor stream when introduced into the column from a radial inlet.
Figure 2:
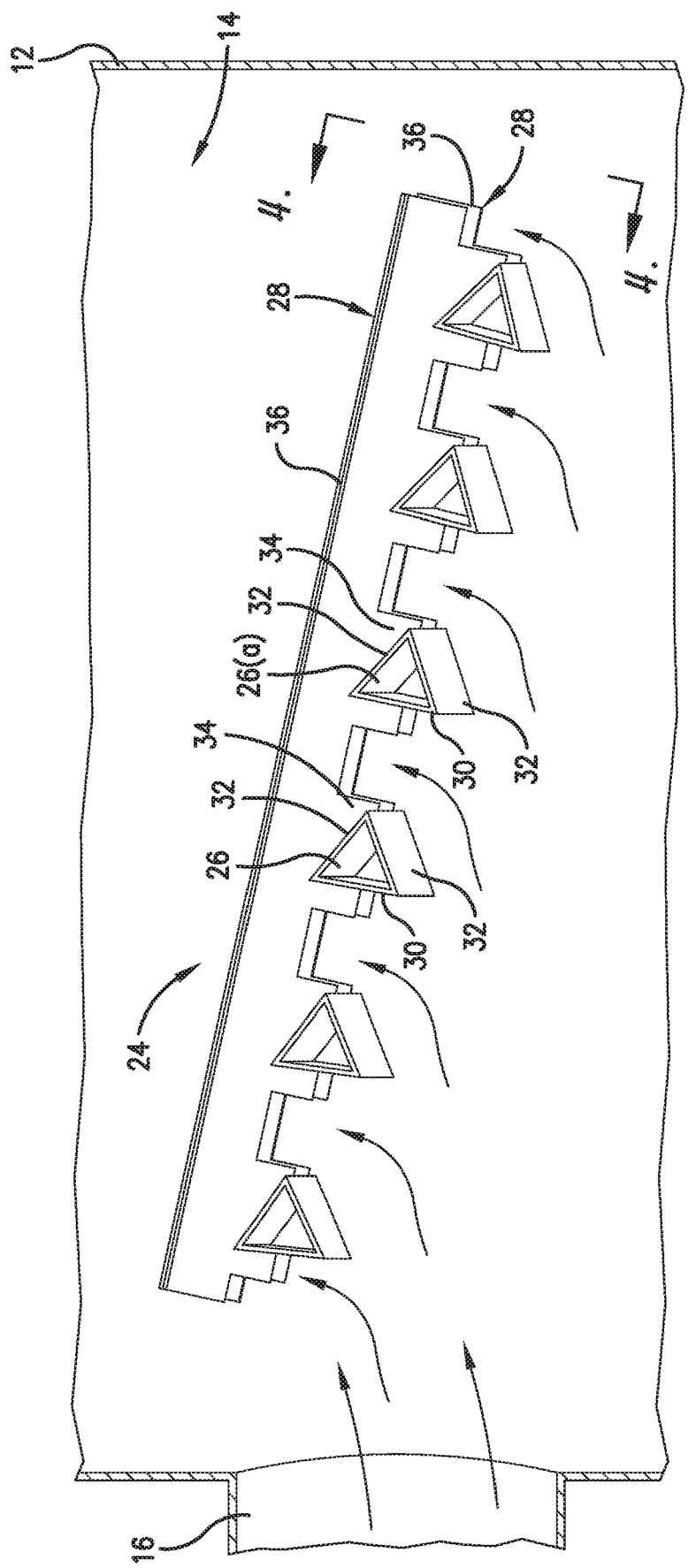
FIG. 2 is an enlarged, fragmentary, side elevation view of the mass transfer column shown in FIG. 1 and schematically showing the vapor distributor receiving and redistributing the vapor stream introduced into the mass transfer column from the radial inlet.

Turning now to the drawings in greater detail, and initially to FIG. 1, a mass transfer column is designated generally by the numeral 10 and includes an upright cylindrical shell 12 that defines an open internal region 14. The shell 12 is of any suitable diameter and height and is constructed from suitably rigid materials that are preferably inert to, or otherwise compatible with the fluids and conditions present within the mass transfer column 10. Although the shell 12 of the mass transfer column 10 is shown in a cylindrical configuration, other shapes, including polygonal, may be used.

The mass transfer column 10 is of a type used to process fluid streams, including in refining separation, petrochemical, chemical and other process applications in which severe conditions such as fouling, coking, erosion, and corrosion are a problem. The fluid streams comprise one or more ascending vapor streams and one or more descending liquid streams. One of the vapor streams is directed into the open internal region 14 of the mass transfer column 10 through a radial inlet 16 extending through the shell 12 at an appropriate location along the height of the mass transfer column 10. One or more vapor streams may also be generated within the mass transfer column 10 in addition to the vapor stream that is introduced into the mass transfer column 10 through the radial inlet 16. A liquid stream may be directed into the open internal region 14 through another radial inlet 18 positioned above the radial inlet 16 that introduces the vapor stream into the open internal region 14. The mass transfer column 10 will also typically include an overhead line 20 for removing a vapor product or byproduct and a bottom stream takeoff line 22 for removing a liquid product or byproduct from the mass transfer column 10. Other column components that are typically present, such as feed points, sidedraws, reflux stream lines, reboilers, condensers, liquid distributors, and the like, are not illustrated in the drawings because an illustration of these components is not believed to be necessary for an understanding of the present disclosure.

A vapor distributor 24 of the present disclosure is positioned within the internal region 14 of the mass transfer column 10 at a location to receive and redistribute a vapor stream when it is radially-introduced into the internal region 14 through the radial inlet 16 in the shell 12 of the mass transfer column 10. The vapor distributor 24 comprises a plurality of elongated deflectors 26 that are arranged in an array and at least one brace 28 that extends longitudinally across the array of deflectors 26 and holds the individual deflectors 26 in spaced apart and side-by-side relationship to each other. The deflectors 26 and braces 28 should be constructed so that they do not present surfaces that allow for the ready build-up of material deposited from the vapor stream. The deflectors 26 are arranged in a descending array with the deflector 26 located closest to the radial inlet 16 being at a higher elevation than the remaining deflectors 26. The deflectors 26 may be positioned in the array such that adjacent deflectors 26 are in partially overlapping elevations or they may be positioned such that there is no overlap. The deflectors 26 may be equally spaced vertically and/or horizontally from each other or the vertical and/or horizontal spacing may be varied for specific applications.

Each of the deflectors 26 has a non-circular cross section and comprises a deflecting surface 30 that faces toward the radial inlet 26. The deflectors 26 and deflecting surfaces 30 are positioned so that separate portions of the vapor stream that is introduced into the internal region 14 through the radial inlet 26 are redirected by the individual deflecting surfaces 30 in a predominately upward direction. The deflecting surfaces 30 have a geometric shape in the direction facing toward the radial inlet 26 so that changing the rotational position of the deflectors 26 causes a change in the manner in which the deflecting surfaces 30 redirect the portions of the vapor stream.

Figure 6:
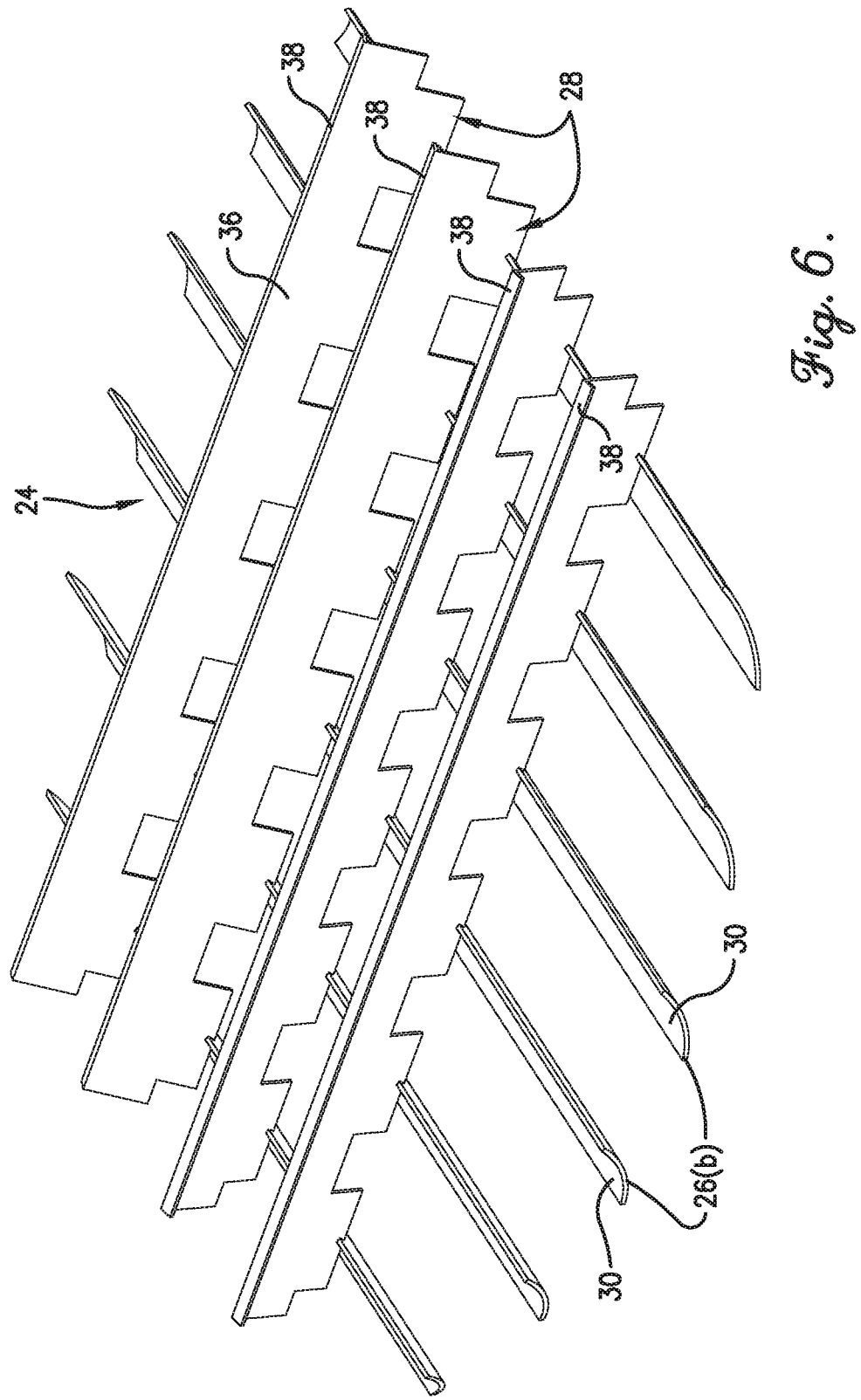
FIG. 6 is a top perspective view of a further embodiment of a vapor distributor.

The deflectors 26 may be in the form of pipes 26a having a multiple-sided cross section, which in the embodiments illustrated in FIGS. 1-5 is a triangular cross section comprising the deflecting surface 30 and two adjoining surfaces 32 that each extends at an acute angle from opposite ends of the deflecting surface 30. In another embodiment as shown in FIGS. 6 and 7, the deflectors 26 may be in the form of vanes 26b in which the deflecting surfaces 30 have a concave geometrical shape in the direction facing toward the radial inlet 16. Each of the deflectors 26 may be of the same geometrical configuration or they may be of different geometrical configurations. For example, some of the deflectors 26 may have a triangular cross section as shown in FIGS. 1-5 and other deflectors 26 may have concave cross section as shown in FIGS. 6 and 7. Other combinations of shapes for the deflectors is possible.

The deflecting surfaces 30 may be planar or curvilinear and may comprise a single surface or multiple surface segments. In one embodiment of the vapor distributor 24, the deflecting surfaces 30 of the deflectors 26 are parallel to each other and face in a common direction toward the radial inlet 16. In other embodiments, the deflecting surfaces 30 need not be parallel to each other so long as they face toward the radial inlet 16. The deflecting surfaces 30 of the deflectors 26 in the descending array are positioned so that they operate to redirect in a predominately upwardly direction successive portions of the vapor stream flowing from the radial inlet 16 into the open internal region 14 of the mass transfer column 10. The deflecting surfaces 30 thus reduce the radial velocity of the vapor stream, redirect it upwardly, and more uniformly redistribute it across the cross section of the open internal region 14 of the mass transfer column 10. The non-circular cross section of the deflectors 26 is advantageous in that it allows the vapor distributor 24 to be optimized during construction for use in specific applications by fixing the deflectors 26 at predetermined rotational positions to obtain the desired angle(s) of incidence at which the portions of the vapor stream are redirected by the deflecting surfaces 30. The angle of incidence may be the same or different for each of the deflecting surfaces 30. For example, the angle of incidence for successive deflecting surfaces 30 may increase or decrease in a direction proceeding away from the radial inlet 16.

The deflectors 26 in the array of deflectors 26 have longitudinal lengths and may be arranged so that their opposite ends lie along a notional circle, which may coincide with or be spaced radially inward from an inner surface of the shell 12. The deflectors 26 may each extend linearly, curvilinearly, or they may have multiple linear or curvilinear segments that are joined together to form the length of each of the deflectors 26.

Each brace 28 is joined to the deflectors 26 by welding, bolting, or other suitable means. To facilitate joining of the brace 28 to the deflectors 26, the brace 28 may include tabs 34 that are shaped to conform to sides of the deflectors 26. In the embodiment illustrated in FIGS. 1-4, a pair of the braces 28 are used to hold the deflectors 26 in the array. The pair of braces 28 extend across the array of deflectors 26 and are positioned in spaced apart relationship to each other a common distance from a notional centerline of the radial inlet 16. In the embodiments illustrated in FIG. 5 and in FIGS. 6 and 7, another pair of braces 28 is also used. In other embodiments, additional pairs of braces 28 may be used or the braces 28 need not be arranged in pairs. For example, one of the braces 28 may be positioned along the notional centerline of the radial inlet 16. The braces 28 may extend longitudinally in directions that are parallel to each other or they may extend in non-parallel relationship to each other, such as by converging toward each other in a direction toward or away from the radial inlet 16. The longitudinal directions of the braces 28 may be perpendicular to a longitudinal direction of the deflectors 26 or they may extend at other angles in relation to the deflectors 26.

Figure 3:
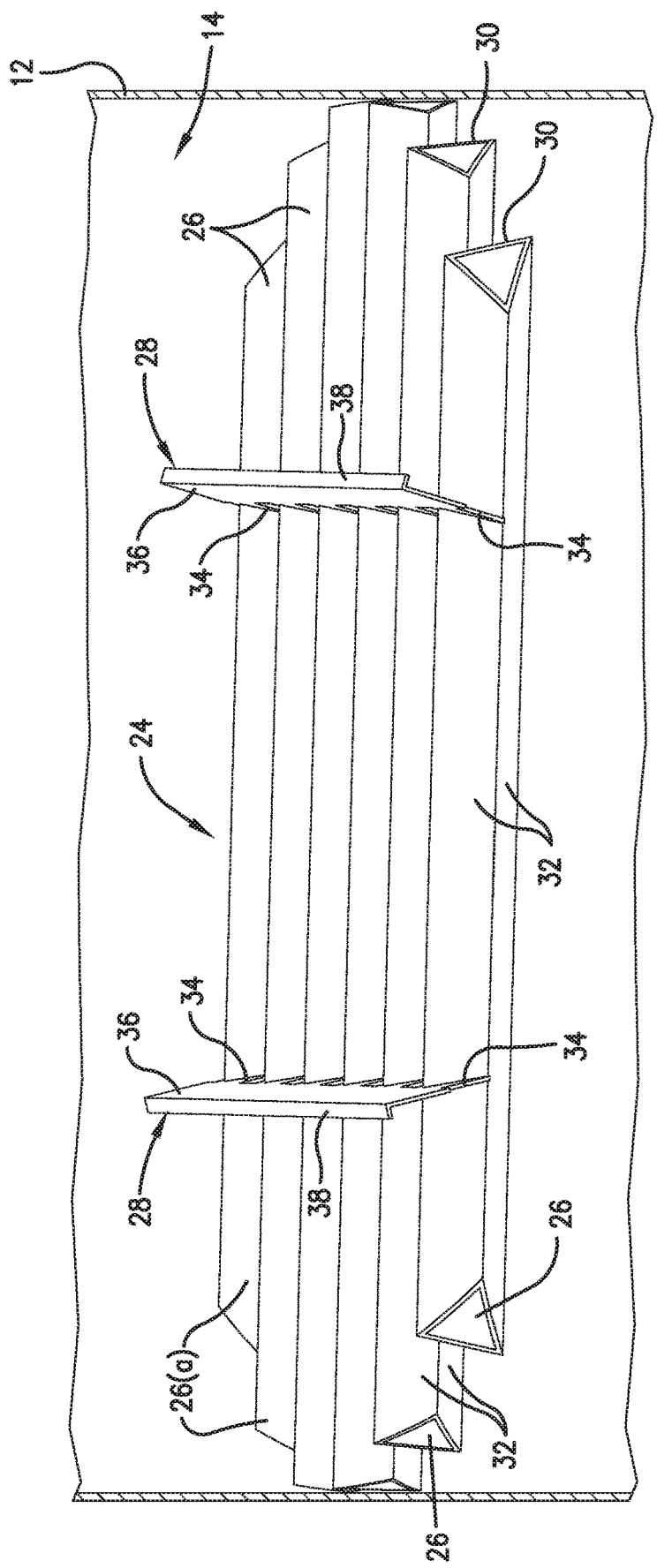
FIG. 3 is a rear elevation view of the vapor distributor within a fragmental portion of the mass transfer column.
Figure 4:
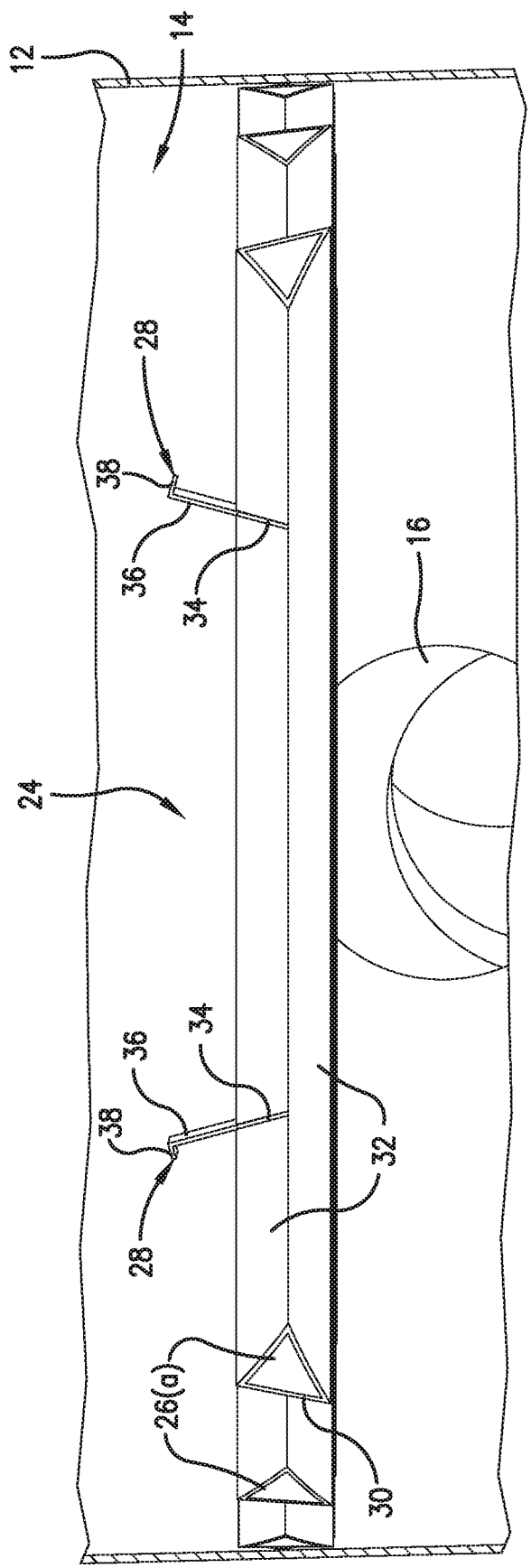
FIG. 4 is a rear perspective view of the vapor distributor within a fragmental portion of the mass transfer column and taken along line 4-4 of FIG. 2 in the direction of the arrows in order to show the radial inlet.
Figure 5:
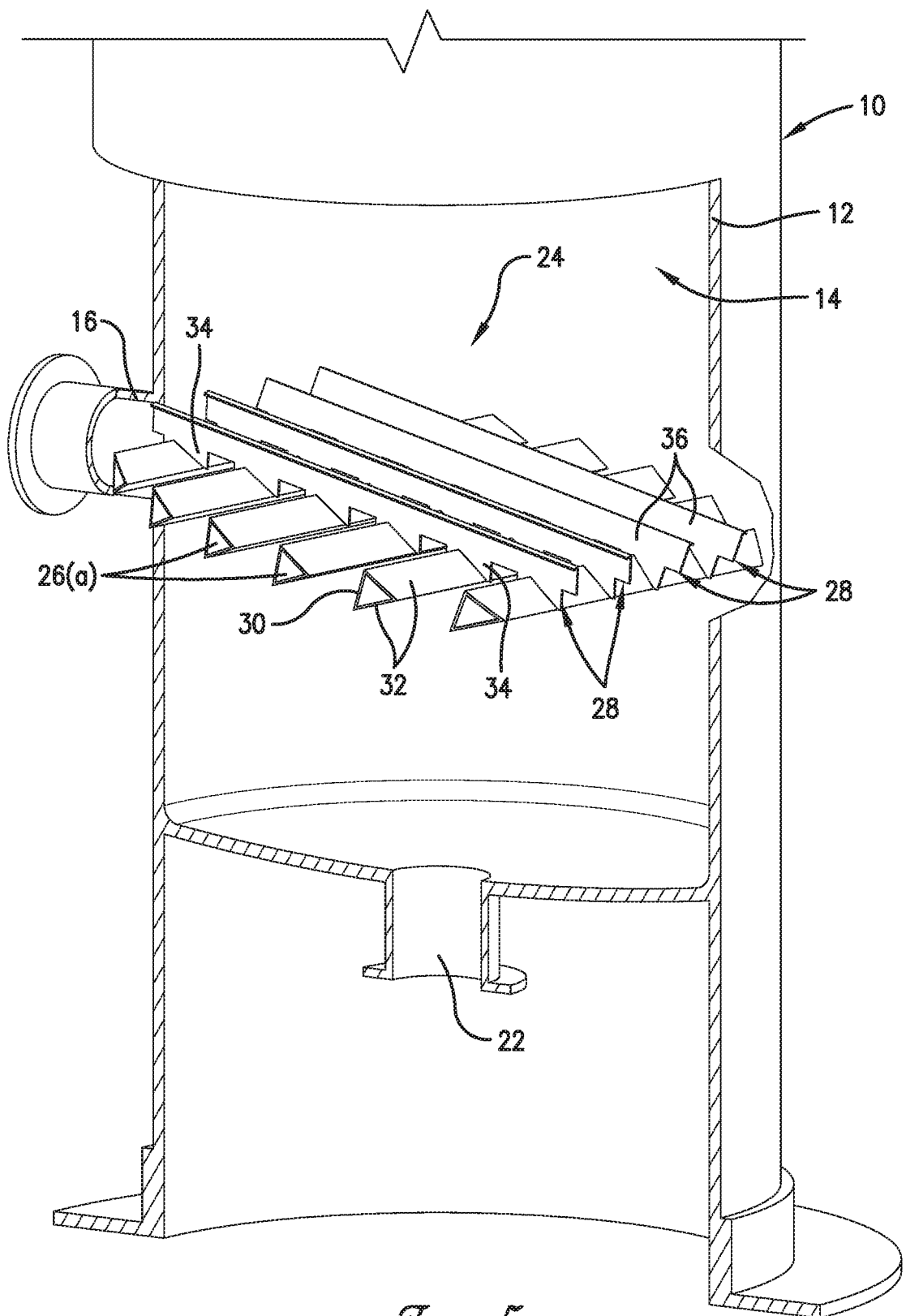
FIG. 5 is a side perspective view of the mass transfer column having portions of its shell broken away to show another embodiment of a vapor distributor positioned to receive and redistribute a vapor stream when introduced into the column from a radial inlet.

Each of the braces 28 includes a strut 36 extending upwardly above the array of deflectors 26. In another embodiment, some or all of the struts 36 may extend downwardly below the array of deflectors 26. The struts 36 may be used to redirect portions of the vapor stream that has entered the open internal region 14 through the radial inlet 16 to cause the portions of the vapor stream to be redistributed across the cross section of the open internal region 14. The struts 36 may extend upwardly in directions that are parallel to each other or that diverge or converge toward each other. In one example, two or more braces 28 are positioned on each side of the notional centerline of the radial inlet 16 and their struts 36 are bent so that they slope outwardly from the notional centerline of the radial inlet 16 to further strengthen the vapor distributor 24 and to facilitate the desired redistribution of the vapor stream. The struts 36 may extend longitudinally in a direction that is perpendicular to a longitudinal direction of the deflectors 26 or they may extend in directions that converge or diverge toward each other at their ends that are closest to the radial inlet 16 to facilitate the desired vapor redistribution. In another embodiment, the struts 36 may extend upwardly in directions that diverge from each other. The struts 36 may be strengthened in various other ways, including by bending the struts 36 along one or more bend lines to create a stiffening flange 38, as best seen in FIGS. 3, 4 and 6, or a joggle.

The vapor distributor 24 may be secured to the shell 12 of the mass transfer column 10 in various ways, such as by welding, bolting or otherwise securing the ends of the deflectors 26 and/or the braces 28 to the inner surface of the shell 12 or to mounting brackets (not shown) that are welded or otherwise secured to the inner surface of the shell 12.

The vapor distributor 24 is used in a method of distributing the vapor stream within the mass transfer column 10 by introducing the vapor stream into the open internal region 14 of the shell 12 in a radial direction through the radial inlet 16 at a radial velocity and then reducing the radial velocity and upwardly redistributing the vapor stream by causing successive portions of the vapor stream to be upwardly redirected from the radial direction by the deflecting surfaces 30 of the deflectors 26 in the descending array of deflectors 26. The method also includes redistributing other portions of the vapor stream by causing the other portions of the vapor stream to be laterally redirected by the struts 36 that extend upwardly from the braces 28. The vapor distributor 24 is effective to facilitate a more uniform horizontal distribution of the vapor stream as it ascends to a mass transfer zone above the radial inlet 16 while the spaced-apart deflectors 26 are resistant to severe conditions such as fouling, coking, erosion, and corrosion which may be present in refining separation, petrochemical, chemical and other process applications.

From the foregoing, it will be seen that this disclosure is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the disclosure.

Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A vapor distributor for placement in an internal region of a mass transfer column to receive and upwardly redistribute a vapor stream when it is introduced into the internal region through a radial inlet in a shell of the mass transfer column, said vapor distributor comprising:

a plurality of elongated deflectors arranged in an array and each having a non-circular cross section; and at least two braces that extend longitudinally across the array of deflectors and are positioned in spaced apart relationship to each other to hold the deflectors in spaced apart and side-by-side relationship to each other,
wherein each of said deflectors comprises a deflecting surface and wherein the deflecting surfaces face in a common direction toward the radial inlet when the vapor distributor is placed in the internal region of the mass transfer column,
wherein each of the braces includes a strut extending upwardly above the array of deflectors,
wherein at least one of the struts extends upwardly in a direction that diverges from another of the struts.

2. The vapor distributor of claim 1, wherein the braces extend longitudinally in a direction that is perpendicular to a longitudinal direction of the deflectors.

3. The vapor distributor of claim 1, wherein the deflectors are vanes in which the deflecting surfaces are concave in geometric configuration or pipes having a multiple-sided cross section.

4. The vapor distributor of claim 3, wherein the deflectors in the array of deflectors are arranged so that their opposite ends lie along a notional circle.

5. The vapor distributor of claim 1, wherein the array in which the deflectors are arranged is a descending array in which the deflector positioned closest to the radial inlet is at a higher elevation than the deflector positioned furthest from the radial inlet when the vapor distributor is placed in the internal region of the mass transfer column.

6. The vapor distributor of claim 5, wherein the deflectors are held by the braces so that adjacent ones of the deflectors are positioned in partially overlapping elevations when the vapor distributor is placed in the internal region of the mass transfer column.

7. The vapor distributor of claim 1, wherein the deflectors are held by the braces so that adjacent ones of the deflectors are positioned in partially overlapping elevations when the vapor distributor is placed in the internal region of the mass transfer column.

8. The vapor distributor of claim 1, wherein each of the struts includes a stiffening flange.

9. A mass transfer column comprising:
an upright shell defining an open internal region;
a radial inlet positioned at an elevation in the shell for introducing a vapor stream into the open internal area;
a vapor distributor positioned in the open internal area at an elevation at least partially overlapping with the elevation of the radial inlet and comprising:
a plurality of elongated deflectors arranged in a descending array in which the deflector positioned closest to the radial inlet is at a higher elevation than the deflector positioned furthest from the radial inlet, wherein each of the deflectors has a non-circular cross section;
a pair of braces that extend across the array of deflectors and are positioned in spaced apart relationship to each other a common distance from a notional centerline of the radial inlet to hold the deflectors in spaced apart and side-by-side relationship to each other,
wherein each of said deflectors has a deflecting surface and the deflecting surfaces of the deflectors face toward the radial inlet and are positioned at different elevations,
wherein each of the braces extends longitudinally in a direction that is perpendicular to a longitudinal direction of the deflectors,
wherein each of the braces includes a strut extending upwardly above the array of deflectors,
wherein the struts extend upwardly in directions that diverge from each other.

10. The mass transfer column of claim 9, wherein the deflectors are vanes in which the deflecting surfaces are concave.

11. The mass transfer column of claim 9 wherein the deflectors are pipes having a triangular cross section.

12. The mass transfer column of claim 9, wherein the elongated deflectors in the array of elongated deflectors are arranged so that their opposite ends lie along an inner surface of the shell.

13. The mass transfer column of claim 9, including another pair of the braces.

14. A method of distributing a vapor stream within a mass transfer column of claim 9, comprising the steps of:
introducing a vapor stream into the open internal region of the shell in a radial direction through the radial inlet at a radial velocity; and
reducing the radial velocity and upwardly redistributing the vapor stream by causing successive portions of the vapor stream to be upwardly redirected from the radial direction by the deflecting surfaces of the deflectors in the array of deflectors.

15. The method of claim 14, redistributing other portions of the vapor stream by causing the other portions of the vapor stream to be redirected by struts that extend upwardly from the braces.

16. The method of claim 15, wherein the other portions of the vapor stream are directed laterally by the struts.

17. The mass transfer column of claim 9, wherein the deflectors and deflecting surfaces are positioned to redirect in an upward direction a vapor stream entering the mass transfer through the radial inlet.

18. The mass transfer column of claim 17, including another one of the braces positioned along the notional centerline of the radial inlet.

* * * * *